Dec. 5, 1939.      H. F. VICKERS      2,182,459
VALVE HOUSING AND ROTOR
Filed Jan. 8, 1937      2 Sheets-Sheet 1

INVENTOR.
Harry F. Vickers
BY
Barnes, Kisselle, Laughlin & Raisch
ATTORNEYS

Dec. 5, 1939.   H. F. VICKERS   2,182,459
VALVE HOUSING AND ROTOR
Filed Jan. 8, 1937   2 Sheets-Sheet 2
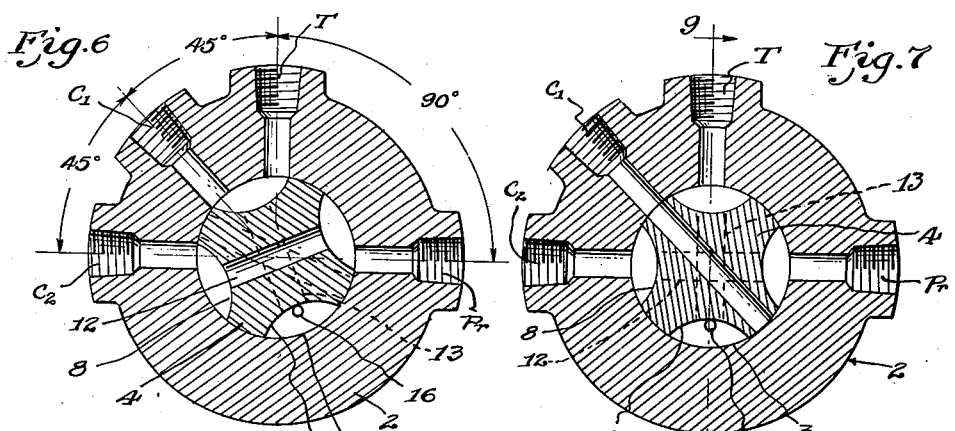
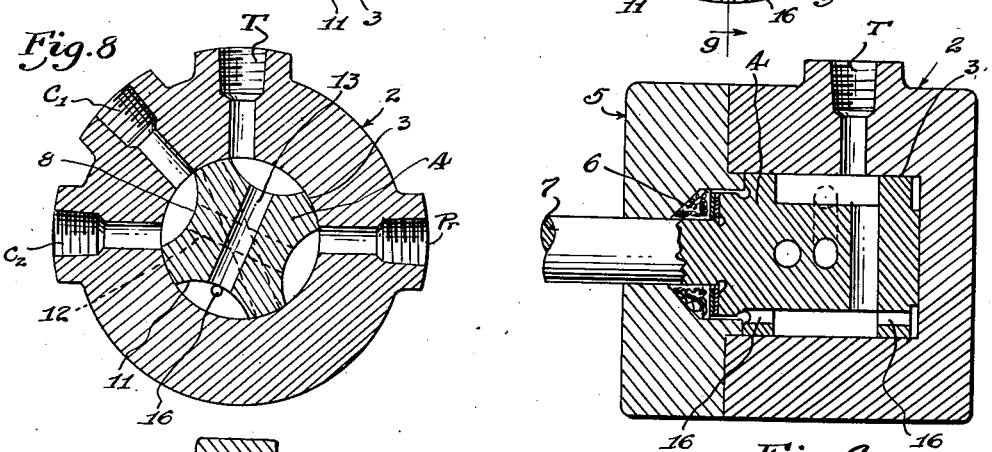
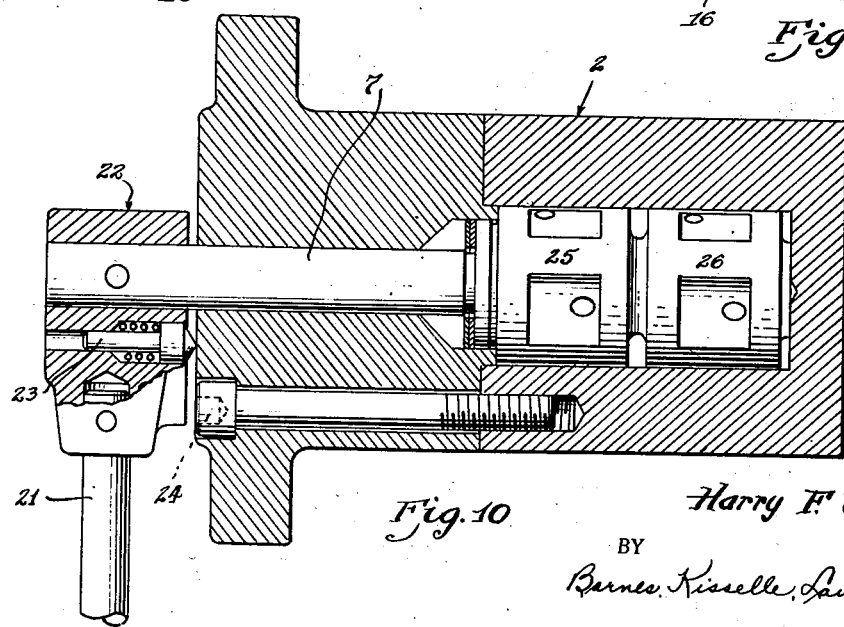
INVENTOR.
Harry F. Vickers
BY
Barnes, Kisselle, Laughlin & Raisch
ATTORNEYS Patented Dec. 5, 1939

2,182,459

UNITED STATES PATENT OFFICE 2,182,459

VALVE HOUSING AND ROTOR

Harry F. Vickers, Detroit, Mich., assignor to Vickers, Incorporated, Detroit, Mich., a corporation of Michigan Application January 8, 1937, Serial No. 119,561

1 Claim. (Cl. 251—104)

This invention relates to a valve housing and rotor, and has to do particularly with novel three and four-way valve structure and continuous balancing means therefor.

Balancing per se has been quite common in many types of rotary plug valves, but such balancing feature has usually been accomplished by a separate conduit connecting the pressure inlet with the opposite wall of the valve whereby to attempt to balance the valve when in shut-off position.

While the general object of the present invention is to provide a balanced rotary valve for the directional control and flow of fluids, the more specific object has to do with the extremely simple and compact structure for obtaining three and four-way directional control, at the same time obtaining a balancing action under all conditions of operation and in all positions. The balancing feature of my rotary valve is inherent in the valve design itself.

Other features include the arrangement of ports, the use of the balancing chambers or depressions as working chambers, the novel design of cross passageways in each rotor opening into flow and balancing channels, and the manner of positively preventing pressure on the packing or packings, as will be more clearly set forth in the specification and claim.

In the drawings:

Fig. 6 is a horizontal sectional view of a three-way rotary valve casing and valve rotor showing particularly a modified form of port arrangement.

Figs. 7 and 8 are similar to Fig. 6, but illustrating different positions of the valve rotor.

Fig. 9 is a vertical sectional view taken on line 9—9 of Fig. 7.

Fig. 10 is a vertical sectional view of a complete valve unit similar to that shown in Figs. 1 to 4, but of the double pilot valve type.

Referring particularly to the four-way rotary valve (shown in Figs. 1 to 4), I have shown a valve casing 2 which, as will be seen, is very compact and of relatively small diameter. This casing is provided with ports designated $Pr$, $T$, $C_1$ and $C_2$, and in the general use of such casing $T$ represents the tank outlet port, $Pr$ the pressure intake port, and $C_1$ and $C_2$ the cylinder ports. However, as will be later explained, these port connections may be changed without in any way affecting the balancing arrangement.

Figure 4:
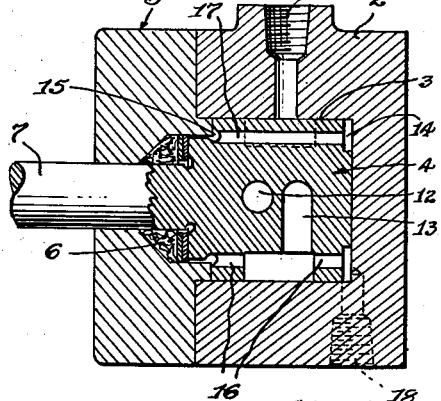
Fig. 4 is a vertical sectional view taken on line 4—4 of Fig. 2.

The casing 2 is provided with an inner cylindrical chamber 3 for receiving a valve rotor which may be generally designated 4. As best shown in Fig. 4, the cylindrical chamber 3 terminates in a closed end which forms a solid part of the casing 2 and the other open end is closed by a cap 5 provided with a packing gland 6 which cooperates with the shaft 7 of the rotor valve.

The general contour of the rotor valve 4 is cylindrical, as will be best seen by referring to Fig. 10. Diametrically positioned milled out depressions 8, 9, 10 and 11 are formed in the walls of the valve rotor, the top and bottom of each depression terminating short of the top and bottom of the valve rotor 4. Flow passageways 12 and 13 are formed to pass diametrically through the body of the valve rotor 4 and are preferably arranged at right angles to each other. The ports $Pr$, $T$, $C_1$ and $C_2$ are preferably in the same horizontal plane, and it will thus be seen by referring to Fig. 4, that all the ports in the casing and the cross passageways in the valve rotor are within the plane of the top and bottom of the depressions 8, 9, 10 and 11. The bottom portion of the valve rotor 4 is shouldered as at 14 and the top portion is recessed as at 15.

When the port $T$ is used as a tank connection in the valve set up, apertures 16 formed in the rotor valve at the top and bottom of the depression 11 prevent the building of pressure on the packing and also prevent the tendency to blow out the valve. When the port $T$ is not used as a tank connection, then apertures 16 are plugged up or left out in the original machinery and a hole 17 drilled through one of the solid extensions of the rotor valve is used to connect the packing portion of the valve with the shoulder or recess 14. In this case a connection 18 is used to drain the ends of the valve in the packing. For normal uses of the valve both relief apertures 16 and 17 may be used as they are both connected up by the grooves 14 and 15.

Figure 1:
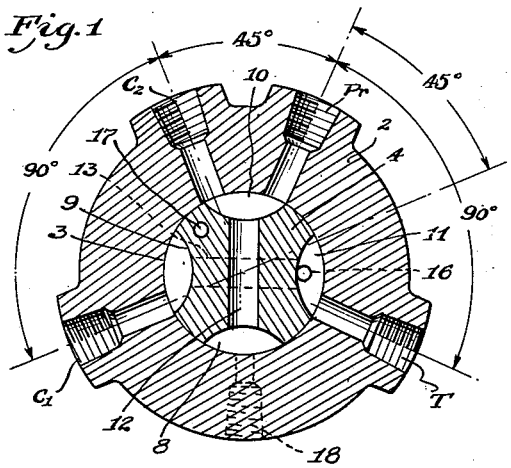
Fig. 1 is a horizontal sectional view of a four-way valve illustrating the preferred arrangement of ports in the valve housing and the shape and design of the valve rotor.

In operation of the valve, it will be seen that when the valve rotor is positioned as shown in Fig. 1, which is the extreme counterclockwise position, the pressure port connects to the cylinder port $C_2$ and the cylinder $C_1$ is connected to the tank port T. The pressure port even though it is connected to the port $C_2$ through the medium of the depression or recess 10, is completely balanced by the recess 8 formed diametrically on the opposite side of the valve; although not so important, the valve is also balanced in the other direction in that the surfaces 9 and 11 are also balancing surfaces as they present equal areas to the liquid flowing from $C_1$ to T. When the valve is rotated 22½° to the center position shown in Fig. 2, it will be seen that pressure is cut off from $C_1$ and $C_2$, in which case the balancing area 8 still serves as a balancing pressure area. When the valve is rotated 45° to the extreme clockwise position shown in Fig. 3, it will be seen that the pressure port connects to cylinder port $C_1$ and that the cylinder port $C_2$ is connected to the tank port T. Here the surface area 10 is still balanced by the surface area 8 although the arcuate depression 8 here forms a working area in addition to a balancing area. Particular attention is called to the fact that the supply port Pr and return port T are positioned 90° apart and that the cylinder ports assume a 45° relationship from the port Pr, and the port $C_1$ bisects the angle between the ports Pr and T.

Figure 2:
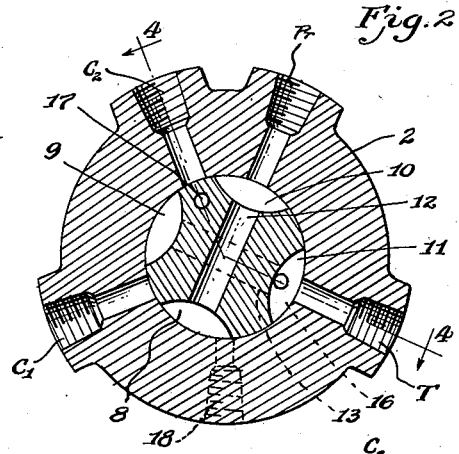
Figs. 2 and 3 are similar to Fig. 1, except showing the rotor valve in different directional control positions.
Figure 3:
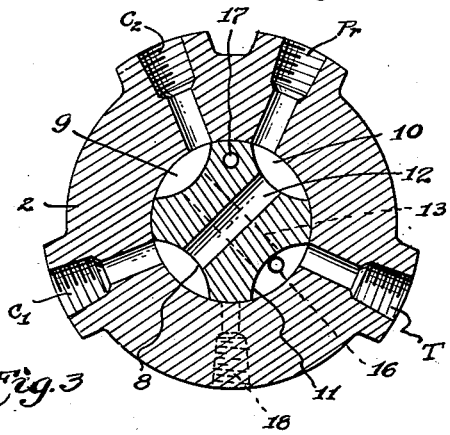
Figure 5:
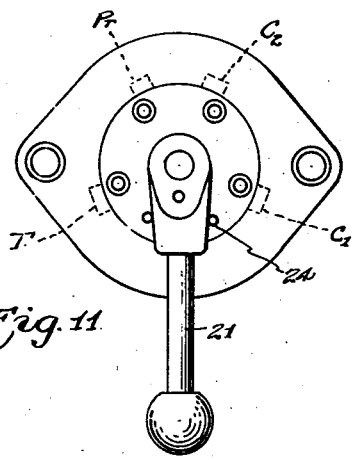
Fig. 5 is a fragmentary sectional view illustrating a slightly modified form of rotor for use in the position of the valve rotor shown in Fig. 2.

In the modification shown in Fig. 5 wherein the valve seat corresponds to the position shown in Fig. 2, it will be seen that the ports $C_1$ and $C_2$ are connected by means of auxiliary conduits 19 and 20, with the result that the cylinder ports are connected at the center or closed position of the valve. It will be understood that the valve unit shown in Figs. 1 to 5 may be used as a three way valve unit by plugging one of the cylinder ports or may be used as a two way valve by plugging the connections $C_1$ and T. In every instance and in every position, the surface 8 acts as a balancing surface for the pressure surface 10.

It will thus be seen that I have provided a valve casing having ports arranged at substantially 90° and 45° angles and a rotor valve having cross passageways the surfaces of such valve being so fabricated as to inherently provide balanced surfaces so that the valve is completely balanced in all positions of operation whether used as a four way, three way or two way valve.

In Figs. 6 to 9 I have illustrated a commercial three way valve unit embodying the present invention. The valve and casing structure is identical with the structure illustrated in Figs. 1 to 4 with the exception that the port $C_2$ has been changed 45° so that it is positioned in alignment with the pressure port or 45° from the port $C_1$. In the drawings the ports Pr and T and ports $C_1$ and $C_2$ are shown reversed from their markings in Figs. 1 to 4. It will be understood that such reversals may take place in Figs. 1 to 4 and that such markings are merely used to show the commercial adaptation of the valve. It will be further understood that the port $C_2$ in the three way valve shown in Figs. 6 to 9 has no real function in connection with the valve except for convenience as it will be obvious that this port can be connected around the valve to the pressure port instead of going through the valve.

In operation with the valve in position shown in Fig. 6, which is the extreme counterclockwise position, it will be seen that the pressure ports connect to the cylinder port $C_2$ and that the cylinder port $C_1$ connects to tank. If the valve is rotated 22½° to the center position, as shown in Fig. 7, it will be seen that the pressure port connects to cylinder port $C_2$ and that $C_1$ is blocked off. If the valve rotated 45° to the extreme clockwise position, Fig. 8, it will be seen that the pressure connects to both cylinders $C_1$ and $C_2$. Here, as in a four way valve, the depressed surfaces of the valve rotor are balanced at all times and in all positions of directional control. Here the balancing surface 11 opposite the tank port serves solely as a balancing surface as it never becomes an operating chamber or channel. The area bounded by the balancing surface 11 is in constant communication with the tank port T through the passageway 13 so as to relieve pressure on the opposite ends of the valve rotor through the medium of the apertures 16 and 17. By connecting the two ends of the valve with the return port through the apertures 16 and 17, the necessity for an end rotor shaft heretofore used on the side of the valve opposite the operating shaft is eliminated. Here, as in Figs. 1 to 3, it will be seen that the supply and return ports are positioned 90° apart and that the port $C_2$ which is the only effective port in this three way valve, is positioned 45° from the port T. Thus, in either the forms shown in Figs. 1 to 3 or 6 to 8, there is a cylindrical casing and a cylindrical valve rotor wherein each set of diametrically opposite surfaces on the valve, in combination with the cross ports, completely balance the valve in any position of operation.

Figure 11:
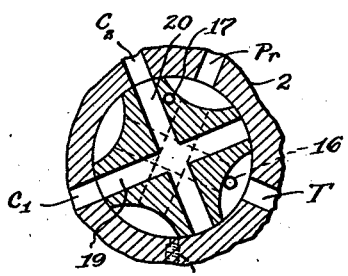
Fig. 11 is a plan view of the valve structure shown in Fig. 2.

In the modification shown in Figs. 10 and 11, I have shown a handle member 21, together with a housing 22 which may be used in operating the unit shown in either Figs. 4 or 9. It will be seen that a spring pressed plunger 23 cooperates with the depressions 24 to positively position the valve in any one of the three positions. Duplicate rotor valves 25 and 26 are integrally connected with the stem 7 for simultaneous movement, the structure of the valve casing and housing being the same as shown and described in connection with Figs. 1, 2 and 9.

What I claim is:

A pilot valve for directing the flow of fluid, comprising a valve casing, supply and return ports and one or more operative ports terminating in a cylindrical valve chamber open at only one end, a rotary valve positioned for rotary movement to open or neutral position within said chamber, diametrically positioned depressions formed around the surface of said rotor valve for cooperating with said ports, independent cross passageways connecting said depressions, the exposed surface area of opposed depressions being substantially equal whereby the pressure conditions existing adjacent any port will be balanced on the opposite side of the valve in any one of a plurality of positions of the rotor valve, a packing gland at one end of said rotor valve, and adjacent the open end of said valve chamber, a drainage connection, means forming a part of said rotor valve for connecting said packing gland with said connection in any one of a plurality of positions of said rotor valve, and auxiliary ports in said rotor valve for connecting said operating ports when the valve is in neutral position.

HARRY F. VICKERS.